June 19, 1956 E. L. CROSBY, JR., ET AL 2,751,443

COAXIAL LOW-NOISE AMPLIFIER

Filed Sept. 28, 1953

EDWARD L. CROSBY, JR.
CHARLES E. PFUND
*INVENTORS*

*BY*

Killman and Kerst
ATTORNEYS

United States Patent Office 2,751,443 Patented June 19, 1956

2,751,443

COAXIAL LOW-NOISE AMPLIFIER

Edward L. Crosby, Jr., Baltimore, and Charles E. Pfund, Timonium, Md., assignors to Bendix Aviation Corporation, Towson, Md., a corporation of Delaware Application September 28, 1953, Serial No. 382,790

8 Claims. (Cl. 179—171)

This invention relates to low-noise amplifier circuits for the input stages of sensitive radio receivers or the like, and in particular, to low-noise amplifiers for use at frequencies in the U. H. F. region.

The type of amplifier generally considered to have the lowest noise figure and therefore the best performance with low input signals is the cascode amplifier. This circuit was completely and thoroughly analyzed by Wallman et al. in the Proceedings of the IRE for June 1948, starting at page 700. Briefly, the circuit consists of a tube whose cathode is returned to the R. F. ground reference with the input signal being inserted between the grid and the R. F. ground reference. The plate thereof is electrically connected to the cathode of a second tube whose grid is at R. F. ground potential. The output signal is derived from the plate of the second tube.

The present invention discloses a circuit arrangement by which distributed parameters are adapted to the cascode type low-noise amplifier, thus extending the application of it to higher frequencies than those permitted when employing lumped parameters.

An object of the present invention is to provide an improved low-noise amplifier circuit for use in the U. H. F. range.

Another object is to provide a circuit for improving the performance of the cascode type amplifier at U. H. F.

Figure 1:
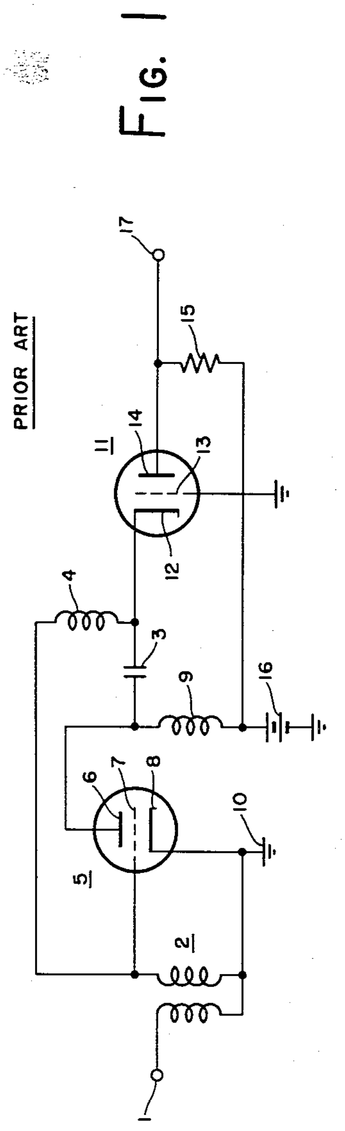
Figure 2:
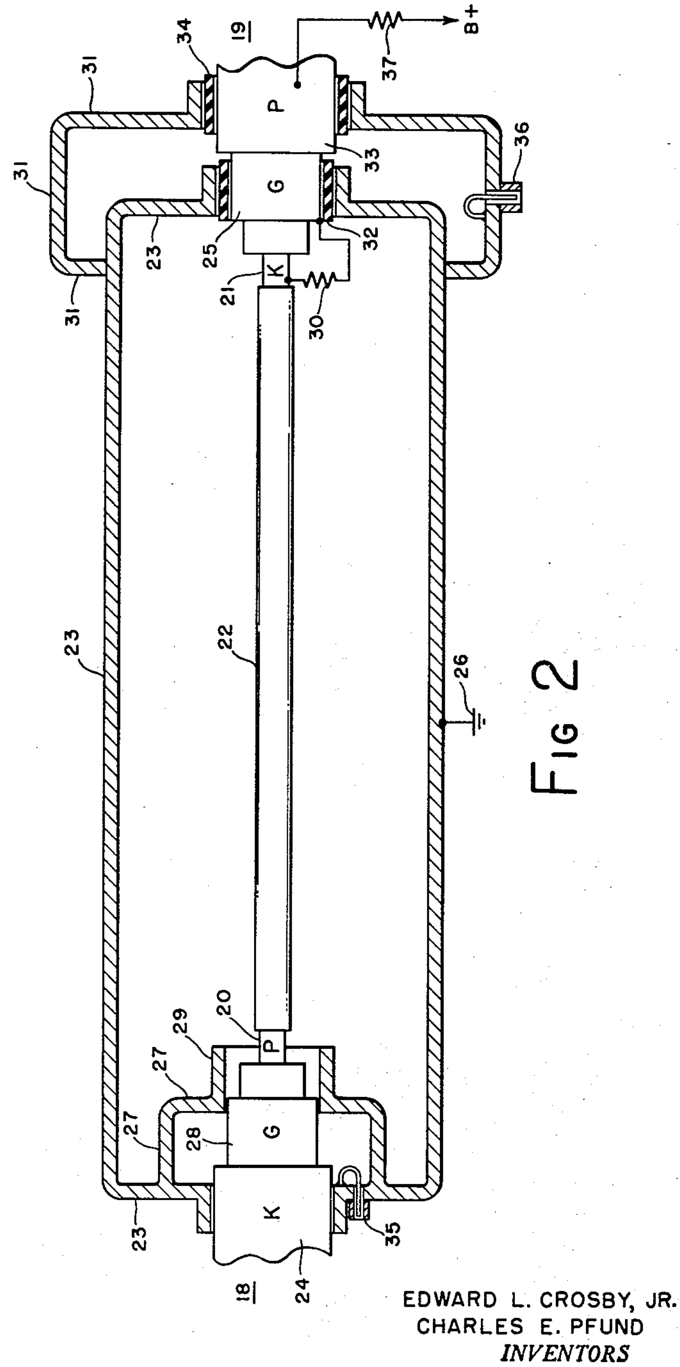

These and other objects will be appreciated from the following disclosure when conjoined with the attending drawings wherein:

Fig. 1 is a schematic diagram of a conventional low-noise cascode amplifier as illustrated and discussed in the above mentioned reference; and Fig. 2 is a semi-schematic diagram of a low-noise series type cascode amplifier for use in the U. H. F. range.

Referring to Fig. 1, there is shown an input terminal 1 that is joined to one terminal of the primary winding of a transformer 2 while the other terminal of the primary winding is returned to a ground reference 10. The secondary winding of the transformer 2 is inserted between the grid 7 of a tube 5 and the ground reference 10. The cathode 8 of the tube 5 is connected to the ground reference 10. The transformer 2 couples into the circuit the signal between the input terminal 1 and the ground reference 10, while the secondary winding thereof performs the additional function of providing a low impedance D. C. circuit and a high impedance R. F. circuit between the grid 7 and the ground reference 10. The value of the inductance appearing across the secondary winding may be selected such that when it operates in conjunction with the interelectrode capacitance between the grid 7 and the cathode 8, and at the mean frequency of the input signals, a parallel reasonant circuit will exist between these electrodes. Affixed to the plate 6 of the tube 5 is a terminal of a capacitor 3, while the other terminal of the capacitor 3 is joined to the cathode 12 of a tube 11 and to a terminal of an inductance 4. The remaining terminal of the inductance 4 is joined to the grid 7 of the tube 5. The characteristics of the inductance 4 are such that at the aforementioned frequency, a parallel resonant circuit is formed by the combination of the interelectrode capacitance between the grid 7 and the plate 6, and the series combination of the inductance 4 and the capacitor 3. Connected between the positive side of a D. C. source 16 and the plate 6 of the tube 5, is an inductor 9. The negative side of the D. C. source 16 is returned to the ground reference 10. The grid 13 of the tube 11 is returned to the ground reference 10. The plate 14 of the tube 11 is connected to the D. C. source 16 through a resistor 15. The output signal is obtained between the output terminal 17, which is connected to the plate 14 of the tube 11, and the ground reference 10.

To extend the usefulness of the low-noise amplifier into the U. H. F. range requires the use of distributed parameters. The circuit in Fig. 1 does not lend itself to a simple and practical version when transposed into a distributed parameter circuit. The system of the present invention circumvents these difficulties by an arrangement such that a D. C. path exists through a series combination of the tubes.

Fig. 2 is a semi-schematic diagram of a low-noise amplifier for use in the U. H. F. range. Tubes 18 and 19 are of the planar triode type and perform the same functions as the tubes 5 and 11 of Fig. 1, respectively. The plate 20 of the tube 18 is connected to the cathode 21 of the tube 19 by a metal conductor 22, which acts as the center conductor of a coaxial line whose outer conductor is a housing 23. One end of the housing 23 is joined to the cathode 24 of the tube 18 while the other end is capacitively coupled to the grid 25 of the tube 19. The length of the coaxial line is one-half of an electrical wave-length of the mean frequency of the input signals so that the plate 20 and the cathode 21 are at the same R. F. potential with respect to a ground reference 26. Similarly, the R. F. potential from the cathode 24 to the ground reference 26 will be the same as the R. F. potential from the grid 25 to the ground reference 26.

The combination of a portion of the housing 23 and a plurality of walls 27 form a cavity which is designed and adjusted, such that, in cooperation with the interelectrode capacitance between the cathode 24 and the grid 28 of tube 18, a high R. F. impedance exists between these two electrodes. Because the combination of the portion of the housing 23 and the plurality of walls 27 is continuous, the cathode 24 and the grid 28 are at zero D. C. potential with respect to the ground reference 26.

Because the element arrangement of triodes is such that the grid must always be between the plate and the cathode, the physical connection to the grid of a planar triode must always be between these elements. A benefit is received from this situation by extending the connection to the grid 28 by a sleeve 29. The length of the sleeve 29 is designed such that, in conjunction with the interelectrode capacitance between the grid 28 and the plate 20, a high A. C. impedance exists between these elements. This is the same result that is produced between the plate 6 and the grid 7 by virtue of the inductance 4 in the circuit of Fig. 1.

A resistor 30 is connected between the cathode 21 and the grid 25 such that when the tube 19 is operating with no grid current flowing, these electrodes are at the same D. C. potential with respect to the ground reference 26.

The combination of another portion of the housing 23 and a plurality of walls 31 form another cavity. This cavity is capacitively coupled to the grid 25 by virtue of a sleeve 32 of dielectric material and to a plate 33 of the tube 19 by virtue of a sleeve 34 of dielectric material. The cavity is designed and adjusted such that, in conjunction with the capacity presented by the insertion of the dielectric materials 32 and 34 and the interelectrode capacitance between the grid 25 and the plate 33, a high R. F. impedance is present between these electrodes, at the aforementioned frequency.

A D. C. source of potential is applied, through a resistor 37, between the plate 33 and the ground reference 26.

The input signal is inserted into the circuit through a coupling arrangement 35 while the output signal from the network is received from a coupling arrangement 36.

In correlating the description of the semi-schematic diagram of Fig. 2 with the schematic diagram of Fig. 1, the similarity in the operation of the two circuits is evident. Consequently, all those advantages acquired through the use of the circuit in Fig. 1 at lower frequencies have been maintained at U. H. F. through the use of the circuit in Fig. 2.

Specific values and descriptions of the physical arrangement of the semi-schematic diagram of the invention as illustrated in Fig. 2 have been used in describing the operation thereof. As an example, the length used for the coaxial line was one-half of an electrical wavelength of the mean frequency of the incoming signals. It is evident that the same results are produced by the coaxial line if it is designed to be any number of one-half electrical wavelengths long. Also biasing arrangements and the use of inductances in place of the resistors are other obvious variations. Therefore, while certain embodiments have been employed in the preceding discussion, it will be apparent to one skilled in the art that the invention is not limited to these embodiments.

What is claimed is:

1. A low-noise amplifier system comprising: a pair of planar triode tubes; a coaxial connection between the plate and the cathode of the first of said tubes and the cathode and the grid of the second of said tubes respectively; the center conductor of said coaxial connection being a direct connection between said plate of said first of said tubes and said cathode of said second of said tubes; the outer conductor of said coaxial connection being capacitively connected between said cathode of said first of said tubes and said grid of said second of said tubes; said coaxial connection joining said tubes such that the R. F. potential between one set of extremities of said conductors is equal to the R. F. potential between the other set of extremities thereof; means being designed and adjusted, in conjunction with the inter-electrode capacitance between said cathode and the grid of said first of said tubes, such that an R. F. impedance exists between these electrodes; a second means being designed and adjusted, in conjunction with the interelectrode capacitance between said grid and said plate of said first of said tubes, such that a parallel resonant circuit exists between these electrodes; a coupling arrangement inserting an input signal into said system; an impedance means connected between said cathode and said grid of said second of said tubes; a third means being designed and adjusted, in conjunction with the interelectrode capacitance of said grid and the plate of said second of said tubes, such that an R. F. impedance exists between these electrodes; a source of potential; an impedance means connected between said plate of said second of said tubes and said source of potential; and a coupling means for removing an output signal from said system.

2. A low-noise amplifier system in accordance with claim 1 in which: said impedance means connected between said cathode and said grid of said second of said tubes is a resistor, and said impedance means connected between said plate of said second of said tubes and said source of potential is a second resistor.

3. A low-noise amplifier system comprising: a pair of planar triode tubes; a coaxial connection between the plate and the cathode of the first of said tubes and the cathode and the grid of the second of said tubes respectively; the center conductor of said coaxial connection being a direct connection between said plate of said first of said tubes and said cathode of said second of said tubes; the outer conductor of said coaxial connection being capacitively connected between said cathode of said first of said tubes and said grid of said second of said tubes; said coaxial connection joining said tubes such that the R. F. potential between one set of extremities of said conductors is equal to the R. F. potential between the other set of extremities thereof; means forming a cavity connecting said cathode of said first of said tubes to the grid of said first of said tubes; said means being designed and adjusted, in conjunction with the interelectrode capacitance between said cathode and said grid of said first of said tubes, such that an R. F. impedance exists between these electrodes; a sleeve extending from said grid of said first of said tubes and surrounding said plate thereof; said sleeve being designed and adjusted, in conjunction with the interelectrode capacitance between said grid and said plate of said first of said tubes, such that a parallel resonant circuit exists between these electrodes; a coupling arrangement inserting an input signal into said cavity; an impedance means connected between said cathode and said grid of said second of said tubes; a housing forming a second cavity between said grid and the plate of said second of said tubes; said housing being capacitively coupled to said grid and said plate of said second of said tubes; said housing being designed and adjusted, in conjunction with the interelectrode capacitance of said grid and said plate of said second of said tubes and said capacitance coupling between said housing and said grid and said plate of said second of said tubes, such that an R. F. impedance exists between these electrodes; a source of potential; a second impedance means connected between said plate of said second of said tubes and said source of potential; and a coupling means for removing an output signal from said second cavity.

4. A low-noise amplifier system in accordance with claim 3 in which: said impedance means connected between said cathode and said grid of said second of said tubes is a resistor, and said second impedance means connected between said plate of said second of said tubes and said source of potential is a second resistor.

5. A low-noise amplifier system comprising: a pair of planar triode tubes; a coaxial connection between the plate and the cathode of the first of said tubes and the cathode and the grid of the second of said tubes respectively; the center conductor of said coaxial connection being a direct connection between said plate of said first of said tubes and said cathode of said second of said tubes; the outer conductor of said coaxial connection being capacitively connected between said cathode of said first of said tubes and said grid of said second of said tubes; said coaxial connection joining said tubes such that the R. F. potential between one set of extremities of said conductors is equal to the R. F. potential between the other set of extremities thereof; means forming a cavity connecting said cathode of said first of said tubes to the grid of said first of said tubes; said means being designed and adjusted, in conjunction with the interelectrode capacitance between said cathode and said grid of said first of said tubes, such that an R. F. impedance exists between these electrodes; a second means being designed and adjusted, in conjunction with the interelectrode capacitance between said grid and said plate of said first of said tubes, such that a parallel resonant circuit exists between these electrodes; a coupling arrangement inserting an input signal into said cavity; an impedance means connected between said cathode and said grid of said second of said tubes; a housing forming a second cavity between said grid and the plate of said second of said tubes; said housing being capacitively coupled to said grid and said plate of said second of said tubes; said housing being designed and adjusted, in conjunction with the interelectrode capacitance of said grid and said plate of said second of said tubes and said capacitance coupling between said housing and said grid and said plate of said second of said tubes, such that an R. F. impedance exists between these electrodes; a source of potential; a second impedance means connected between said plate of said second of said tubes and said source of potential; and a coupling means for removing an output signal from said second cavity.

6. A low-noise amplifier system in accordance with claim 5 in which: said impedance means connected between said cathode and said grid of said second of said tubes is a resistor, and said second impedance means connected between said plate of said second of said tubes and said source of potential is a second resistor.

7. A low-noise amplifier system comprising: a pair of planar triode tubes; a coaxial connection between the plate and the cathode of the first of said tubes and the cathode and the grid of the second of said tubes respectively; the center conductor of said coaxial connection being a direct connection between said plate of said first of said tubes and said cathode of said second of said tubes; the outer conductor of said coaxial connection being capacitively connected between said cathode of said first of said tubes and said grid of said second of said tubes; said coaxial connection joining said tubes such that the R. F. potential between one set of extremities of said conductors is equal to the R. F. potential between the other set of extremities thereof; a means being designed and adjusted, in conjunction with the interelectrode capacitance between said cathode and said grid of said first of said tubes, such that an R. F. impedance exists between these electrodes; a sleeve extending from said grid of said first of said tubes and surrounding said plate thereof;

said sleeve being designed and adjusted, in conjunction with the interelectrode capacitance between said grid and said plate of said first of said tubes, such that a parallel resonant circuit exists between these electrodes; a coupling arrangement inserting an input signal into said system; an impedance means connected between said cathode and said grid of said second of said tubes; a second means being designed and adjusted, in conjunction with the interelectrode capacitance of said grid and said plate of said second of said tubes, such that an R. F. impedance exists between these electrodes; a source of potential; a second impedance means connected between said plate of said second of said tubes and said source of potential; and a coupling means for removing an output signal from said system.

8. A low-noise amplifier system in accordance with claim 7 in which: said impedance means connected between said cathode and said grid of said second of said tubes is a resistor, and said second impedance means connected between said plate of said second of said tubes and said source of potential is a second resistor.

References Cited in the file of this patent

UNITED STATES PATENTS

| | | |
|---|---|---|
| 2,524,821 | Montgomery | Oct. 10, 1950 |
| 2,615,998 | Charchian | Oct. 28, 1952 |
| 2,673,254 | Eland | Mar. 23, 1954 |